United States Patent [19]
Dettmers et al.

[11] Patent Number: 6,073,654
[45] Date of Patent: Jun. 13, 2000

[54] HYDRAULICALLY TRIPPABLE CHECK VALVE FOR UNDERGROUND MINE SUPPORT HYDRAULICS

[75] Inventors: Michael Dettmers, Kamen; Wolfgang Kobow, Wuppertal; Werner Reinelt, Bochum, all of Germany

[73] Assignee: DBT Deutsche Bergbau-Technik GmbH, Germany

[21] Appl. No.: 09/276,348

[22] Filed: Mar. 25, 1999

[30] Foreign Application Priority Data

Mar. 28, 1998 [DE] Germany ............................ 198 13 909

[51] Int. Cl.⁷ ................................................. F16K 15/18
[52] U.S. Cl. ....................................... 137/630.15; 137/630
[58] Field of Search ......................... 137/630.15, 630, 137/629

[56] References Cited

U.S. PATENT DOCUMENTS

| | | | |
|---|---|---|---|
| 2,653,626 | 9/1953 | Finlayson | 137/599.2 |
| 3,213,887 | 10/1965 | Angelery | 137/630.15 |
| 3,447,568 | 6/1969 | Burkart et al. | 137/630.15 |
| 3,631,887 | 1/1972 | Schlechtriem | 137/630.15 |
| 3,638,689 | 2/1972 | Eklund | 137/630.15 |
| 3,906,991 | 9/1975 | Haussler | 137/630.15 |
| 4,562,862 | 1/1986 | Mucheyer et al. | 137/630.15 |
| 5,618,086 | 4/1997 | Reuter | 137/630.15 |
| 5,669,413 | 9/1997 | Hegglin et al. | 137/630.15 |

FOREIGN PATENT DOCUMENTS

| | | |
|---|---|---|
| 2130656 | 12/1971 | Germany . |
| 1814214 | 5/1977 | Germany . |
| 3407878 | 6/1985 | Germany . |
| 1 233 328 | 5/1971 | United Kingdom . |
| 1 379 455 | 1/1975 | United Kingdom . |
| 1 562 675 | 3/1980 | United Kingdom . |

*Primary Examiner*—Gregory L. Huson
*Assistant Examiner*—Joanne Y. Kim
*Attorney, Agent, or Firm*—Vickers, Daniels & Young

[57] ABSTRACT

The body (1) of the hydraulically trippable check valve for mine support hydraulics according to the invention contains: a valve poppet (13) biased in the closing direction by a spring (22); a control piston (17) which can be acted on by a hydraulic control pressure, causing the poppet (13) to be lifted off its seat (11); and an initial relief valve (20, 21) which can be tripped by the control piston (17) against its spring closing force. Matters are arranged so that the control piston (17) which can be acted on by the hydraulic control pressure is dimensioned in terms of piston surface area (17') so that the poppet (13) of the check valve cannot be lifted off its seat (11) until the opening of the initial relief valve has caused a predetermined initial relief of operating pressure on the high-pressure side. The result is a hydraulically pilot-controlled check valve which has high operational reliability and in which harmful oscillation or chatter of the valve poppet (13) of the check valve and/or control piston (17) cannot occur.

47 Claims, 1 Drawing Sheet

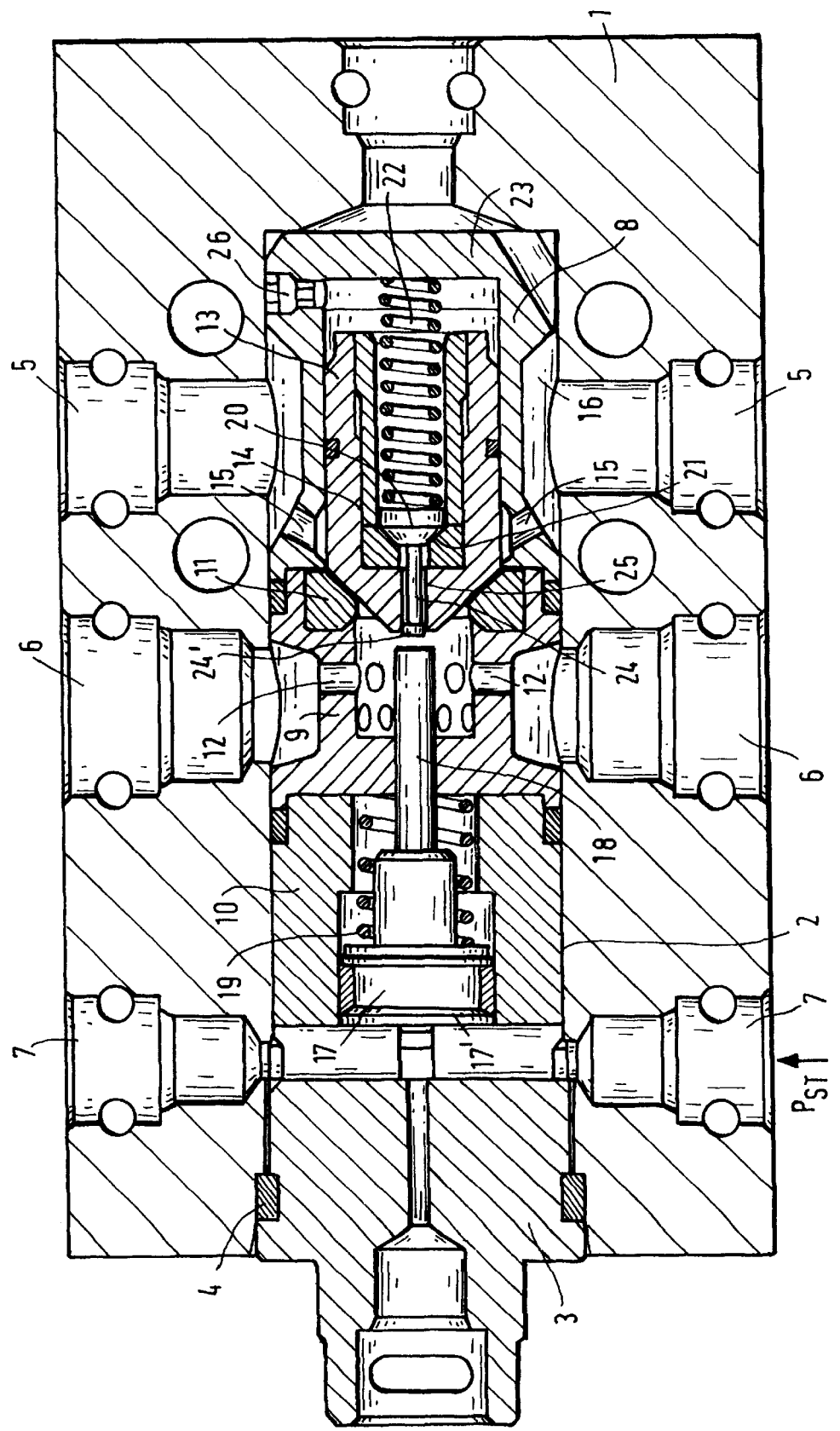

HYDRAULICALLY TRIPPABLE CHECK VALVE FOR UNDERGROUND MINE SUPPORT HYDRAULICS

FIELD OF THE INVENTION

The invention relates to a hydraulically trippable check valve, suitable for example for underground mine support hydraulics.

BACKGROUND OF THE INVENTION

A known form of hydraulically trippable check valve has a poppet which is arranged in the valve body, is biased in the closing direction by a spring and, to relieve pressure on the high-pressure side of the hydraulic system, is liftable off its seat, against the restoring force of the closing spring, by a control piston which is arranged in the valve body and which can be acted on by a hydraulic control pressure, the control piston being provided with a piston plunger acting against the poppet at the latter's discharge end. A hydraulically pilot-controlled check valve of this kind is known from DE 3407878 C1.

In the closed position, such a check valve can serve as a safeguard for the hydraulic prop or props (when set) of a self-advancing support, and, in conjunction with control valves connected, in the gate, to the pressure and return lines of the longwall face power hydraulic system, as a setting valve and also as a recovery valve, the check valve when functioning as a recovery valve being tripped against its spring force by the hydraulic control piston to connect the pressure chambers of the prop or props, which are at high operating pressure, to the return. In the recovery operation, tripping of the check valve is effected by the control piston, acted on by the same high hydraulic pressure of the central longwall face pressure line as that with which the hydraulic props of the self-advancing support are set in the setting operation. Harmful oscillation and chatter of the check valve poppet when opened for the recovery operation are prevented by providing a spring-loaded restrictor in the connection between the back of the valve poppet and the side of the check valve connected to the prop pressure chambers. When the check valve is tripped, the discharge side of the check valve poppet is initially subject to the high operating pressure present in the prop pressure chambers, which is usually around 350–450 bar. This pressure acts in the restoring direction on the control piston and its plunger, which may cause oscillation and chatter of the control piston. To suppress this oscillation and chatter, the control piston needs to have a large diameter, and has to be subjected to a correspondingly high control pressure.

SUMMARY OF THE INVENTION

The invention aims to improve on the hydraulically pilot-controlled check valve of the abovementioned type. The principal aim of the invention is to adapt this check valve for support hydraulics improve its reliability of operation, so that when the check valve is hydraulically tripped by means of the control piston, undesired oscillation and chatter of the control piston and valve poppet—potentially leading to damage or even destruction of the valve—are suppressed, and precise working of the check valve is more assured.

With this aim in mind, what is proposed is to dispose in the check valve body an initial relief valve trippable by the control piston against its spring closing force, and to dimension the control piston in terms of piston surface area that can be acted on by the hydraulic control pressure so that under normal operating conditions the poppet of the check valve cannot be lifted off its seat by the control piston until the opening of the initial relief valve has caused a predetermined initial relief of operating pressure on the high-pressure side, preferably down to a value corresponding to 20–50% of said operating pressure.

In the check valve according to the invention, therefore, the valve poppet which is trippable by the control piston operates in conjunction with an initial relief valve which lowers the high hydraulic operating pressure (equal to the pressure in the prop pressure chambers) acting on the check valve (poppet) to a pressure level at which the poppet of the check valve can be lifted off its seat, against the restoring force of its closing spring, by the control piston. The control piston is designed so that it is incapable of tripping the poppet of the check valve at high operating pressure, which is usually around 350–450 bar, and can only do so after this operating pressure has been lowered to a specified level corresponding to at least about 20–25% of operating pressure through initial tripping of the initial relief valve. This allows precise working of the pilot-controlled check valve to be achieved without the harmful oscillation and chatter of the valve poppet and its control piston which full operating pressure may cause. The control piston can be given a diameter which is smaller than the outer diameter of the poppet of the check valve. The control piston surface area subject to control pressure can be made smaller than the poppet surface area subject to high hydraulic (operating) pressure in the closing direction of the check valve.

The initial relief valve co-operating with the check valve to reduce the operating pressure acting on the latter can have a relatively small sectional area of flow, and can therefore be formed with correspondingly small dimensions. In its preferred form the initial relief valve together with its stopper is arranged inside the poppet of the check valve and is provided with a detent pin or the like directed towards the control piston plunger and extending through an opening in the discharge end of the check valve poppet and, in its closed position, projecting therefrom towards the control piston plunger, the inner chamber of the poppet containing the initial relief valve being connected to the hydraulic connection of the check valve connected to the high-pressure side, so that the high hydraulic operating pressure acts on the stopper of the initial relief valve in the closing direction. When the check valve is in the closed position, therefore, the detent pin or similar projects in the axial direction by a predetermined small distance, which may be only a few millimetres, from the discharge end of the poppet of the check valve, so that the control piston in making its control movement initially strikes the detent pin, thereby opening the initial relieve valve, which it keeps open until the operating pressure on the high-pressure side of the check valve (prop pressure) has fallen to the predetermined level at which the control piston is able to push the valve poppet open against the restoring force of the spring, thereby opening up a larger cross-section of flow to the return for the recovery operation.

The check valve according to the invention can be used not only as a recovery valve but also as a setting valve, as is known in itself. For the setting operation, the valve poppet can, in a known manner, be lifted off the valve seat by the high setting pressure of the hydraulic fluid alone, without the control piston's having to be operated. Even so, opening of the check valve by means of the hydraulically operated control piston is also possible in the setting operation.

As is known in itself, a restrictor can be provided in the hydraulic connection between the high-pressure connection on the body of the check valve and the back of its poppet and the initial relief valve located there, to obtain as nearly as possible oscillation-free working of the plunger- operated initial relief valve and/or the, likewise plunger-operated, valve poppet.

Further advantageous design features of pilot-controlled check valves according to embodiments of the invention are set forth in the claims, and exemplified in the following description of an embodiment.

BRIEF DESCRIPTION OF THE DRAWING

The drawing shows in section a pilot-controlled check valve according to an embodiment of the invention.

DESCRIPTION OF AN EMBODIMENT

To help with the understanding of the present invention, reference is made to the abovementioned DE 3407878 C1, whose disclosure is incorporated herein by reference.

The hydraulically trippable check valve illustrated in the drawing has a valve body 1 in the shape of a more or less rectangular metal body plate which contains the various components of the valve as replaceable fittings inside an axial inner bore 2, the end of which is closed by a stopper 3 or the like, which may also be in the form of a screwed plug, and has a seal 4. The valve body 1 has connections 5, 6 and 7 which are arranged at right angles to the axial inner bore 2. These connections 5, 6 and 7 communicate at their inner end with the axial inner bore 2, and hydraulic lines can be coupled to them in a known manner. In the illustrated embodiment, the connections 5, 6 and 7 are formed by stepped bores and are in each case provided as a pair of opposing connections in the valve body 1 (or its body plate) so that connections may be made on both sides, or optionally on either side, of the valve body. The valve body 1 may, in a known manner, be part of a valve block combining the individual operating valves of the support hydraulics in a modular unit.

In the illustrated embodiment, the axial inner bore 2 of the valve body 1 contains inserts 8, 9 and 10 which are butted together end to end and are sealed against the inner bore, and contain the valve components. The central insert 9 carries the seat 11 of the check valve and has one or more radial connecting bores 12 establishing hydraulic connections to the connection or connections 6, these connecting bores 12 communicating via their inner ends with the interior of the insert 9, which is in the form of a bush. The insert 8 is in the form of a pot containing, in its cylindrical inner opening which is open towards the valve seat 11, the check valve poppet 13, which is formed as a cylindrical hollow body and is guided in, and sealed against, the inner opening of the insert 8 in the closing and opening directions of the valve, the cylindrical inner chamber 14 of the poppet 13 being open at the end opposite to the end forming the poppet's valve cone. The insert 8 is provided with a plurality of connecting bores 15 distributed around its circumference which establish hydraulic connection to the connection or connections 5 and which communicate via their inner ends with the interior of the insert 8, in front of the conical valve seat 11 and the conical seating face of the valve poppet 13. The insert 8 also has a recess 16 around its outer circumference, with which the connecting bores 15 communicate.

The insert 10, which is in the form of a bush, is located on the opposite side of the central insert 9, and contains in its inner through bore a hydraulic control piston 17 guided in, and sealed against, this bore in the axial direction with respect to the valve poppet 13. The control piston 17 carries a plunger 18 directed towards the valve poppet 13 and extending through an axial bore of the insert 9 and through the latter's inner chamber. A return spring 19 is arranged in the inner bore of the insert 10 on the inner ring side of the stepped control piston 17, and rests at one end against the annular face of the control piston 17 located on the plunger side and at the other end against the end face of the central insert 9, pushing the control piston 17 into the reset position shown in the drawing. At the opposite face of the control piston 17 to the return spring, the piston is connected to the hydraulic pilot connection for its hydraulic operation, formed by the connections 7, so that it can be hydraulically driven over its entire piston face against the restoring force of its spring 19 to lift the valve poppet 13 off its seat 11, thus tripping the check valve. The control piston 17 can be controlled by a hydraulic control pressure that is considerably lower than the maximum hydraulic operating pressure corresponding to the pressure in the pressure chambers of the hydraulic props of the self-advancing support. The hydraulic control pressure will therefore conveniently be of the order of 100–150 bar. However, the control pressure can be higher, e.g. it can be of the same order as the hydraulic operating pressure in the prop system. The face of the control piston 17 subjected to the hydraulic control pressure is designated 17'.

Co-operating with the check valve which can be hydraulically tripped by means of the control piston 17 is an initial relief valve arranged axially in line with the plunger 18 in the inner chamber 14 of the valve poppet 13 formed as a cylindrical hollow body. This initial relief valve has a stopper 20 formed as a valve cone, which, in the closed position, rests on a matching conical seat 21 at the bottom of the inner chamber 14 of the poppet 13 and is pressed on the seat 21 by a closing spring 22. The closing spring 22 is located in the inner chamber 14 of the valve poppet 13, and at its opposite end to the stopper 20 rests against the bottom end 23 of the pot-shaped insert 8. It will be seen that the closing spring 22 acting on the stopper 20 also biases the poppet 13 of the check valve in the closing direction, i.e. presses it against its valve seat 11. Thus the initial relief valve with its stopper 20 and the check valve with its poppet 13 have a common closing spring 22, acting against the stopper 20.

Fixed to the stopper 20 at its discharge end, axially in line with the plunger 18 of the control piston 17, is a finger or detent pin 24 which, as shown in the drawing, extends through a bore or opening 25 at the discharge end of the valve poppet 13, at the centre of the valve cone of the poppet 13, and, when the initial relief valve is in the closed position (as shown), projects slightly at its outer tip 24', e.g. by a few millimetres, beyond the discharge end of the poppet 13, and into the inner chamber of the insert 9, so that when hydraulic control pressure is applied to the face 17' of the control piston 17 the tip of the piston plunger 18 first of all strikes the projecting tip 24' of the detent pin 24 and thus opens the stopper 20 of the initial relief valve against the restoring force of the closing spring 22, before striking the discharge end of the valve cone of the poppet 13, so that the poppet 13 is also lifted off its valve seat 11 against the restoring force of the closing spring 22.

The inner chamber 14 of the valve poppet 13 accommodating the initial relief valve is likewise connected hydraulically to the connection or connections 5: in the illustrated embodiment, such connection is via the circumferential recess 16 and at least one radial transverse bore 26 hydraulically connected thereto and communicating, when the check valve is in the closed position, with the inner chamber of the insert 8 behind the valve poppet 13, near the bottom end 23, and thereby with the inner chamber 14 of the poppet 13, so that the high operating pressure (prop pressure) present at the connection 5 during operation acts both on the valve poppet 13 in the closing direction and on the stopper 20 of the initial relief valve in the closing correction, the initial relief valve thus being biased in the closing direction both by the force of the closing spring 22 and by the operating pressure present at the connection 5.

The control piston 17 which can be subjected to the hydraulic control pressure via the connection or connections 7 is dimensioned in terms of piston surface area 17' acted on by the control pressure so that the poppet 13 of the check valve cannot be lifted off its seat 11 by the control piston 17, against the forces acting in the closing direction, until the high operating pressure (equal to the pressure in the prop pressure chamber) of e.g. 300–450 bar present at the connection 5 has been lowered to a considerably reduced pressure level, advisably equal to at least 20–50% of said operating pressure, by the opening of the initial relief valve. It can be seen that the diameter of the control piston 17 is smaller than the outer diameter of the cylindrical valve poppet 13. The surface area 17' of the control piston 17 that can be acted on by the hydraulic control pressure is smaller than the surface area of the valve poppet 13 acted on in the closing direction of the check valve by the operating pressure at the connection 5.

Let it be assumed that the pilot-controlled check valve illustrated in the drawing is connected by its connection 5 to the high operating pressure on the high-pressure side of the hydraulic system, that is to say in the case of a hydraulic self-advancing support to the hydraulic prop pressure chamber or chambers, while the connection 6 of the check valve is connected to the hydraulic return line, which usually leads to an accumulator tank. The connection 7 of the check valve is, as has been described, connected to a hydraulic control pressure line. When the control piston 17 is subjected via the connection 7, over the whole surface 17' of the piston, to the hydraulic control pressure, the control piston 17 moves against the restoring force of its spring 19 so that its plunger 18 first of all strikes the projecting tip 24' of the detent pin 24 thereby lifting the stopper 20 of the initial relief valve off its seat 21 against the restoring force of the closing spring 22. This establishes communication between the connections 5 and 6 of the check valve, so that hydraulic fluid flowing into the inner chamber 14 of the valve poppet 13 via the transverse bore or via some other hydraulic connection is able to pass through the open initial relief valve and the inner chamber of the insert 9 to the connection 6 and so to the return, which lowers the operating pressure at the connection 5 to the considerably reduced pressure level. Only when this has happened is the plunger 18, which in the initial relief valve opening position rests against the discharge end face of the valve cone of the poppet 13, able to lift the poppet 13 off its seat 11 against the restoring force of the closing spring 22, thus opening up the larger discharge cross-section between the connection 5 and the connection 6 and causing the high operating pressure at the connection 5 to be lowered as a result. The hydraulic prop support can be recovered in this switching position. In any case, however, the surfaces of the valve poppet 13 and control piston 17 that are acted on by hydraulic fluid are balanced so that the control piston is unable to lift the poppet 13 off its seat 11 until the high hydraulic operating pressure present at the connection 5 has been lowered to a predetermined pressure by operation of the initial relief valve.

Preferably, matters are arranged so that connections 5 and 6 in the check valve body 1 can be optionally connected to the hydraulic return line or to the hydraulic high-pressure line. For example, it is possible to pressurize the hydraulic props of the self-advancing support in the extension direction, i.e. to set the props, via the check valve. In this case, the high-pressure hydraulic fluid is fed via the connection or connections 6 and the pressure of fluid lifts the valve poppet 13 off the seat 11 against the restoring force of the valve spring 22, allowing high-pressure fluid to pass through the connection 5 to the pressure chamber or chambers of the props. During the setting operation, it is not absolutely necessary for the poppet 13 of the check valve to be tripped by the control piston 17, although this is also possible.

The detent pin 24 on the stopper 20 of the initial relief valve conveniently possesses longitudinal grooves distributed around its circumference and extending in its axial direction. When the initial relief valve is in the open position, these grooves establish the hydraulic connection between the inner chamber of the insert 9 and the inner chamber 14 of the valve poppet 13 and hence with the connection 5. A restrictor may be arranged in a known manner in the abovementioned transverse bore 26 which makes the hydraulic connection between the connection 5 and the inner chamber of the valve poppet 13, in order to obtain a restricted discharge of hydraulic fluid through the transverse bore 26 towards the connection 5 when the initial relief valve and/or the poppet 13 of the check valve opens, thus making it possible to obtain oscillation-free working of these valves when opened.

The invention is of course not limited to the embodiment described above, which can undergo modifications without departing from the spirit and scope of the invention.

We claim:

1. A hydraulically trippable check valve comprising:
   (a) a valve body:
   (b) a poppet valve in the valve body, the poppet valve having a high pressure side and a low pressure side and comprising:
      (i) a valve seat,
      (ii) a poppet having a closed position in which it is seated against said valve seat and an open position in which it is spaced from said valve seat to allow hydraulic fluid to flow between the high pressure side and low pressure side of said poppet valve, and
      (iii) a closing spring which biases said poppet to its closed position;
   (c) a control piston in the valve body, said control piston having a diameter which is smaller than an outer diameter of said poppet, said control piston having:
      (i) a pressure face which can be acted on by a control pressure,
      (ii) a piston plunger moveable by application of the control pressure from a rest position towards said poppet of said poppet valve to act against said poppet and urge it towards its open position,
      (iii) a return spring urging said control piston to its rest position, and
      (iv) a third insert, wherein said control piston and the return spring are arranged in the third insert which is connected to a control pressure connection in said valve body of said check valve; and
   (d) an initial relief valve between said high pressure side and said low pressure side of said poppet valve, the initial relief valve having an open position to allow hydraulic fluid to flow between said high and low pressure sides and a closed position preventing said flow, a closing spring urging said initial relief valve to its closed position, and said initial relief valve being operable by said piston plunger of said control piston, as this plunger moves toward said poppet of said poppet valve, to move from its closed position to its open position; in use, the high pressure side of said poppet valve being exposed to a normal operating pressure, and said pressure face of said control piston having an area selected such that a force applied to said poppet by the piston plunger of said control piston on said application of said control pressure is only sufficient to move said poppet to its open position once said initial relief valve has been operated to cause a predetermined initial relief of operating pressure on said high-pressure side down to a value of 20–50% of said normal operating pressure.

2. The check valve according to claim 1, wherein said poppet of said poppet valve has an internal chamber, and the initial relief valve is arranged inside said internal chamber, the initial relief valve having a stopper and a pin extending from said stopper towards said control piston plunger, said poppet having a discharge end facing the control piston plunger, and an opening through said discharge end through which said pin of said initial relief valve extends, in its closed position said pin projecting from said opening towards said control piston plunger, said internal chamber of said poppet being connected to a high pressure connection of the check valve connected to the high pressure side.

3. The check valve according to claim 2, including a first insert in said valve body, wherein said poppet containing said initial relief valve is arranged in the first insert, said first insert being connected to said high pressure connection via at least one passageway adjacent said valve seat of said poppet valve one passageway open to said internal chamber of said poppet.

4. The check valve according to claim 3, including a plurality of said passageways adjacent the valve seat, these passageways distributed circumferentially around the valve.

5. The check valve according to claim 2, wherein said poppet has the form of a valve cone with a cylindrical barrel containing said initial relief valve.

6. The check valve according to claim 2, wherein said stopper of said initial relief valve has the form of a valve cone tapering towards a discharge end and which carries said pin at its discharge end.

7. The check valve according to claim 1, wherein a common closing spring is provided for said poppet of said poppet valve and said stopper of said initial relief valve.

8. The check valve according to claim 1, including a second insert, said valve seat for said poppet of said poppet valve being arranged on the second insert, said second insert being connectable to a hydraulic return port and being provided with a lead-through opening for said piston plunger of said control piston.

9. The check valve according to claim 1, wherein said valve body includes a metal body with an axial inner bore in which said poppet valve, said initial relief valve, and said control piston with its piston plunger, are arranged in at least one insert, said valve body being provided with transverse bores forming hydraulic connections to said check valve.

10. The check valve according to claim 9, wherein a plurality of inserts are provided in said axial inner bore of said metal body.

11. The check valve according to claim 1, wherein connections in said check valve body on said high and low pressure sides of said poppet respectively, can be optionally connected to a hydraulic return line or to a hydraulic high pressure line of a hydraulic system.

12. The check valve according to claim 1, wherein said hydraulic control pressure is approximately 100–150 bar and said normal hydraulic operating pressure is approximately 300–450 bar.

13. The check valve according to claim 1, wherein said pin on said stopper of said initial relief is provided with axial discharge grooves distributed around its circumference.

14. A hydraulically trippable check valve comprising:
   (a) a valve body:
   (b) a poppet valve in the valve body, the poppet valve having a high pressure side and a low pressure side and comprising:
      (i) a valve seat,
      (ii) a poppet having a closed position in which it is seated against said valve seat and an open position in which it is spaced from said valve seat to allow hydraulic fluid to flow between the high pressure side and low pressure side of said poppet valve, and
      (iii) a closing spring which biases said poppet to its closed position;
   (c) a control piston in said valve body, the control piston having:
      (i) a pressure face which can be acted on by a control pressure,
      (ii) a piston plunger moveable by application of the control pressure from a rest position towards said poppet of said poppet valve to act against said poppet and urge it towards its open position, and
      (iii) a return spring urging said control piston to its rest position; and
   (d) an initial relief valve between said high pressure side and said low pressure side of said poppet valve, the initial relief valve having an open position to allow hydraulic fluid to flow between said high and low pressure sides and a closed position preventing said flow, a closing spring urging said initial relief valve to its closed position, and the initial relief valve being operable by said piston plunger of said control piston, as this plunger moves toward said poppet of said poppet valve, to move from its closed position to its open position.

15. The check valve according to claim 14, wherein said poppet of said poppet valve has an internal chamber, and the initial relief valve is arranged inside said internal chamber, the initial relief valve having a stopper and a pin extending from said stopper towards said control piston plunger, said poppet having a discharge end facing the control piston plunger, and an opening through said discharge end through which said pin of said initial relief valve extends, in its closed position said pin projecting from said opening towards said control piston plunger.

16. The check valve according to claim 15, including a first insert in said valve body, wherein said poppet containing said initial relief valve is arranged in the first insert, said first insert being connected to said high pressure connection via at least one passageway adjacent said valve seat of said poppet valve one passageway open to said internal chamber of said poppet.

17. The check valve according to claim 16, including a plurality of said passageways adjacent the valve seat, these passageways distributed circumferentially around the valve seat.

18. The check valve according to claim 15, wherein said poppet has the form of a valve cone with a cylindrical barrel containing said initial relief valve.

19. The check valve according to claim 15, wherein said stopper of said initial relief valve has the form of a valve cone tapering towards a discharge end and which carries said pin at its discharge end.

20. The check valve according to claim 14, wherein a common closing spring is provided for said poppet of said poppet valve and said stopper of said initial relief valve.

21. The check valve according to claim 14, including a second insert, said valve seat for said poppet of said poppet valve being arranged on the second insert, said second insert being connectable to a hydraulic return port and being provided with a lead-through opening for said piston plunger of said control piston.

22. The check valve according to claim 14, including a third insert wherein the control piston and said return spring are arranged in the third insert which is connected to a control pressure connection in the valve body of the check valve.

23. The check valve according to claim 14, wherein said initial relief valve, and said control piston with its piston plunger, are arranged in at least one insert, said valve body being provided with transverse bores forming hydraulic connections to said check valve.

24. The check valve according to claim 23, wherein a plurality of inserts are provided in said axial inner bore of said metal body.

25. The check valve according to claim 14, wherein connections in said check valve body on said high and low pressure sides of said poppet respectively, can be optionally connected to a hydraulic return line or to a hydraulic high pressure line of a hydraulic system.

26. The check valve according to claim 14, wherein the pressure face of the control piston having an area selected such that a force applied to the poppet by the piston plunger of the control piston on said application of the control pressure is only sufficient to move the poppet to its open position once the initial relief valve has been operated to cause a predetermined initial relief of operating pressure on said high-pressure side down to a value of 20–50% of said normal operating pressure.

27. The check valve according to claim 14, wherein said hydraulic control pressure is approximately 100–150 bar and said normal hydraulic operating pressure is approximately 300–450 bar.

28. The check valve according to claim 14, wherein said pin on said stopper of said initial relief is provided with axial discharge grooves distributed around its circumference.

29. A hydraulically trippable check valve comprising:
(a) a valve body:
(b) a poppet valve in the valve body, the poppet valve having a high pressure side and a low pressure side and comprising:
  (i) a valve seat,
  (ii) a poppet having an internal chamber extending along the longitudinal axis of said poppet and having a top and a bottom opening, said poppet having a closed position in which it is seated against said valve seat and an open position in which it is spaced from said valve seat to allow hydraulic fluid to flow between the high pressure side and low pressure side of said poppet valve, and
  (iii) a closing spring which biases said poppet to its closed position;
(c) a control piston in said valve body, the control piston having:
  (i) a pressure face which can be acted on by a control pressure, and
  (ii) a piston plunger moveable by application of the control pressure from a rest position towards said poppet of said poppet valve to act against said poppet and urge it towards its open position; and
(d) an initial relief valve positioned in said internal chamber of said poppet and between said high pressure side and said low pressure side of said poppet valve, the initial relief valve having an open position to allow hydraulic fluid to flow between said high and low pressure sides and between the top and bottom openings of said internal chamber of said poppet and a closed position preventing said flow, a closing spring urging said initial relief valve to its closed position, and said initial relief valve being operable by said piston plunger of said control piston, as this plunger moves toward said poppet of said poppet valve, to move from its closed position to its open position.

30. The check valve according to claim 29, wherein said initial relief valve having a stopper and a pin extending from the stopper towards the control piston plunger, the poppet having a discharge end facing the control piston plunger, said pin of the initial relief valve extends through said top opening of said internal chamber, in its closed position the pin projecting from said top opening towards the control piston plunger.

31. The check valve according to claim 30, including a first insert in said valve body, wherein said poppet containing said initial relief valve is arranged in the first insert, said first insert being connected to said high pressure connection via at least one passageway adjacent said valve seat of said poppet valve one passageway open to said internal chamber of said poppet.

32. The check valve according to claim 29, wherein a common closing spring is provided for said poppet of said poppet valve and said stopper of said initial relief valve.

33. The check valve according to claim 29, including a second insert, said valve seat for said poppet of said poppet valve being arranged on the second insert, said second insert being connectable to a hydraulic return port and being provided with a lead-through opening for said piston plunger of said control piston.

34. A check valve according to claim 29, comprising a return spring urging the control piston to its rest position.

35. The check valve according to claim 29, including a third insert wherein the control piston and said return spring are arranged in the third insert which is connected to a control pressure connection in the valve body of the check valve.

36. The check valve according to claim 29, wherein said valve body includes a metal body with an axial inner bore in which said poppet valve, said initial relief valve, and said control piston with its piston plunger, are arranged in at least one insert, said valve body being provided with transverse bores forming hydraulic connections to said check valve.

37. The check valve according to claim 29, wherein connections in said check valve body on said high and low pressure sides of said poppet respectively, can be optionally connected to a hydraulic return line or to a hydraulic high pressure line of a hydraulic system.

38. The check valve according to claim 29, wherein the pressure face of the control piston having an area selected such that a force applied to the poppet by the piston plunger of the control piston on said application of the control pressure is only sufficient to move the poppet to its open position once the initial relief valve has been operated to cause a predetermined initial relief of operating pressure on said high-pressure side down to a value of 20–50% of said normal operating pressure.

39. The check valve according to claim 29, wherein said hydraulic control pressure is approximately 100–150 bar and said normal hydraulic operating pressure is approximately 300–450 bar.

40. A hydraulically trippable check return valve comprising:
- (a) a valve body:
- (b) a poppet valve in the valve body, the poppet valve having a high pressure side and a low pressure side and comprising:
  - (i) a valve seat,
  - (ii) a poppet having a closed position in which it is seated against said valve seat and an open position in which it is spaced from said valve seat to allow hydraulic fluid to flow between the high pressure side and low pressure side of said poppet valve, and
  - (iii) a closing spring which biases said poppet to its closed position;
- (c) a control piston in the valve body, the control piston having a diameter which is smaller than an outer diameter of the poppet, the control piston having:
  - (i) a pressure face which can be acted on by a control pressure, said control piston including having a pressure face having a maximum cross sectional area, said poppet having a maximum cross sectional area, said maximum cross sectional area of said pressure face of said control piston being less than said maximum cross sectional area of said poppet, and
  - (ii) a piston plunger moveable by application of the control pressure from a rest position towards said poppet of said poppet valve to act against said poppet and urge it towards its open position; and
- (d) an initial relief valve between said high pressure side and said low pressure side of said poppet valve, the initial relief valve having an open position to allow hydraulic fluid to flow between said high and low pressure sides and a closed position preventing said flow, a closing spring urging the initial relief valve to its closed position, and the initial relief valve being positionable in said open position by said piston plunger of the control piston moving toward and contacting said initial relief valve; said maximum cross sectional area of said pressure face of said control piston selected such that a force applied to said poppet by said piston plunger of said control piston is only sufficient to move said poppet to its open position once the initial relief valve has been moved to said open position by said control piston and the pressure differential between said high and low pressure side of said poppet has been reduced by at least about 20 percent.

41. The check valve according to claim 40, wherein said poppet of said poppet valve has an internal chamber, and the initial relief valve is arranged inside said internal chamber, the initial relief valve having a stopper and a pin extending from said stopper towards said control piston plunger, said poppet having a discharge end facing the control piston plunger, and an opening through said discharge end through which said pin of said initial relief valve extends, in its closed position said pin projecting from said opening towards said control piston plunger.

42. The check valve according to claim 41, including a first insert in said valve body, wherein said poppet containing said initial relief valve is arranged in the first insert, said first insert being connected to said high pressure connection via at least one passageway adjacent said valve seat of said poppet valve one passageway open to said internal chamber of said poppet.

43. The check valve according to claim 40, wherein a common closing spring is provided for said poppet of said poppet valve and said stopper of said initial relief valve.

44. The check valve according to claim 40, including a second insert, said valve seat for said poppet of said poppet valve being arranged on the second insert, said second insert being connectable to a hydraulic return port and being provided with a lead-through opening for said piston plunger of said control piston.

45. The check valve according to claim 40, wherein said initial relief valve and said control piston with its piston plunger, are arranged in at least one insert.

46. The check valve according to claim 40, wherein connections in said check valve body on said high and low pressure sides of said poppet respectively, can be optionally connected to a hydraulic return line or to a hydraulic high pressure line of a hydraulic system.

47. The check valve according to claim 40, wherein said hydraulic control pressure is approximately 100–150 bar and said normal hydraulic operating pressure is approximately 300–450 bar.

* * * * *